(12) United States Patent
Garcia et al.

(10) Patent No.: US 11,273,746 B1
(45) Date of Patent: Mar. 15, 2022

(54) AUTOMOTIVE SEAT HEADREST SUPPORT

(71) Applicant: GM Global Technology Operations LLC, Detroit, MI (US)

(72) Inventors: Alan Garcia, Atizapan de Zaragoza (MX); Alejandro Hernandez Covarrubias, Metepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/204,100

(22) Filed: Mar. 17, 2021

(51) Int. Cl.
*B60N 2/838* (2018.01)
*B60N 2/809* (2018.01)
*B60N 2/897* (2018.01)
*B60N 2/888* (2018.01)

(52) U.S. Cl.
CPC .................... *B60N 2/888* (2018.02)

(58) Field of Classification Search
CPC ....... B60N 2/888; B60N 2/4228; B60N 2/865
See application file for complete search history.

(56) References Cited

U.S. PATENT DOCUMENTS

| | | | | |
|---|---|---|---|---|
| 2,254,566 A * | 9/1941 | Cornell, Jr. | ............... | F16D 3/72 464/57 |
| 4,362,287 A * | 12/1982 | Grongstad | ............ | F16F 15/023 248/563 |
| 4,713,917 A * | 12/1987 | Buckle | .................. | E01D 19/041 248/565 |
| 5,520,222 A * | 5/1996 | Chikama | ............... | A61B 1/0055 138/103 |
| 5,626,418 A * | 5/1997 | Angelis, Sr | ............ | F21S 8/081 248/160 |
| 6,267,529 B1 * | 7/2001 | Mudryk | .................. | E01F 9/629 116/63 R |
| 6,844,495 B2 * | 1/2005 | Pastuch | .................... | F21V 21/12 174/135 |
| 6,880,891 B2 * | 4/2005 | Yetukuri | ................ | B60N 2/815 297/410 |
| 8,672,410 B2 * | 3/2014 | Misawa | ................. | B60N 2/809 297/408 |
| 9,271,886 B2 * | 3/2016 | Stephens | ................ | A61G 5/121 |
| 9,884,573 B2 * | 2/2018 | Takahashi | .............. | B60N 2/809 |
| 10,099,590 B2 * | 10/2018 | Takahashi | .............. | B60N 2/809 |
| 11,028,544 B2 * | 6/2021 | Steele | ...................... | E04H 12/18 |
| 2002/0084686 A1 * | 7/2002 | Takata | .................... | B60N 2/856 297/408 |
| 2003/0001413 A1 * | 1/2003 | Albrecht | ................ | B60N 2/888 297/216.12 |
| 2005/0023086 A1 * | 2/2005 | Szilagyi | .................. | F03G 7/065 188/67 |
| 2005/0116524 A1 * | 6/2005 | Bauer | .................... | B60N 2/838 297/409 |

(Continued)

*Primary Examiner* — Shin H Kim

(57) ABSTRACT

An automotive seat with headrest assembly includes a seatback, a headrest, and a pair of headrest supports adapted to support the headrest on the seatback, each of the headrest supports including a lower rod, an upper rod, and an absorption unit positioned between and interconnecting the lower rod and the upper rod, the absorption unit adapted to allow angular deflection of the upper rod relative to the lower rod when a bending force is applied to the upper and lower rods, and to hold the lower and upper rods in a deflected orientation when the bending force is removed from the upper and lower rods.

18 Claims, 4 Drawing Sheets

(56) References Cited

U.S. PATENT DOCUMENTS

| | | | | |
|---|---|---|---|---|
| 2006/0163919 A1* | 7/2006 | Thiel | ............... | B60N 2/865 |
| | | | | 297/216.12 |
| 2011/0089738 A1* | 4/2011 | Jen | ............... | A47C 7/38 |
| | | | | 297/404 |
| 2012/0326480 A1* | 12/2012 | Misawa | ............... | B60N 2/847 |
| | | | | 297/391 |
| 2013/0127222 A1* | 5/2013 | Ishimoto | ............... | B60N 2/806 |
| | | | | 297/404 |
| 2015/0145309 A1* | 5/2015 | Takahashi | ............... | B60N 2/838 |
| | | | | 297/404 |
| 2015/0165945 A1* | 6/2015 | Takahashi | ............... | B60N 2/809 |
| | | | | 297/404 |
| 2016/0150885 A1* | 6/2016 | Peterson | ............... | A47C 1/023 |
| | | | | 297/408 |

* cited by examiner

AUTOMOTIVE SEAT HEADREST SUPPORT

INTRODUCTION

The present disclosure relates to an automotive seat having a headrest. More particularly, the present invention is related to supports for securing a headrest onto an automotive seat.

It has been a common practice to mount a headrest to an automobile seat for the purpose of promoting safety and protecting a passenger in case of an accident such as a collision. In the case of a collision (including a rear-end collision), the automobile headrest prevents the head of a passenger in the seat from being tilted backwards too much due to the impact of the collision. One side-effect of the headrest is that after the headrest stops rearward motion of the head of a passenger, the head of the passenger will tend to bounce forward.

Thus, while current automobile seat headrests achieve their intended purpose, there is a need for a new and improved automotive seat and headrest that will gradually slow down rearward motion and absorb energy of the head of a passenger when forces push the head of a passenger backward during a collision, and lock the headrest in a deflected position after such forces dissipate to prevent the headrest from pushing forward against the head of the passenger.

SUMMARY

According to several aspects of the present disclosure, an automotive seat with headrest assembly includes a seatback, a headrest, and a pair of headrest supports adapted to support the headrest on the seatback, each of the headrest supports including a lower rod, an upper rod, and an absorption unit positioned between and interconnecting the lower rod and the upper rod, the absorption unit adapted to allow angular deflection of the upper rod relative to the lower rod when a bending force is applied to the upper and lower rods, and to hold the lower and upper rods in a deflected orientation when the bending force is removed from the upper and lower rods.

According to another aspect, each absorption unit includes a first component and a second component, the first components adapted to absorb energy and deflect under bending forces and the second components adapted to lock the first components in the deflected orientation once force is removed.

According to another aspect, each first component is a helical element comprising a length of helically coiled wire, and deflection of the first components expands gaps between adjacent coils of the first components on an outside of the deflected first components.

According to another aspect, each second component is a helical element comprising a length of helically coiled wire encircling the associated first component and extending longitudinally along an entire length of the associated first component, and upon deflection of the first components, coils of the second components slide into the gaps formed between adjacent coils of the first components on an outside of the deflected first components to lock the first components in the deflected orientation.

According to another aspect, a cross sectional shape of the helically coiled wire of each of the second components includes axial surfaces adjacent an inner diameter of the second component, the axial surfaces adapted to engage the coils of the first components when the coils of the second components slide into the gaps formed between adjacent coils of the first components on the outside of the deflected first components to lock the first components in the deflected orientation.

According to another aspect, a cross sectional shape of the helically coiled wire of each of the first components is one of generally circular, oval, or rectangular.

According to another aspect of the present disclosure, each absorption unit includes a first end that is threadingly engaged with the associated upper rod and a second end that is threadingly engaged with the associated lower rod.

According to another aspect, each upper rod is adapted to be received within the headrest.

According to another aspect, each lower rod is adapted to be received within the seatback.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
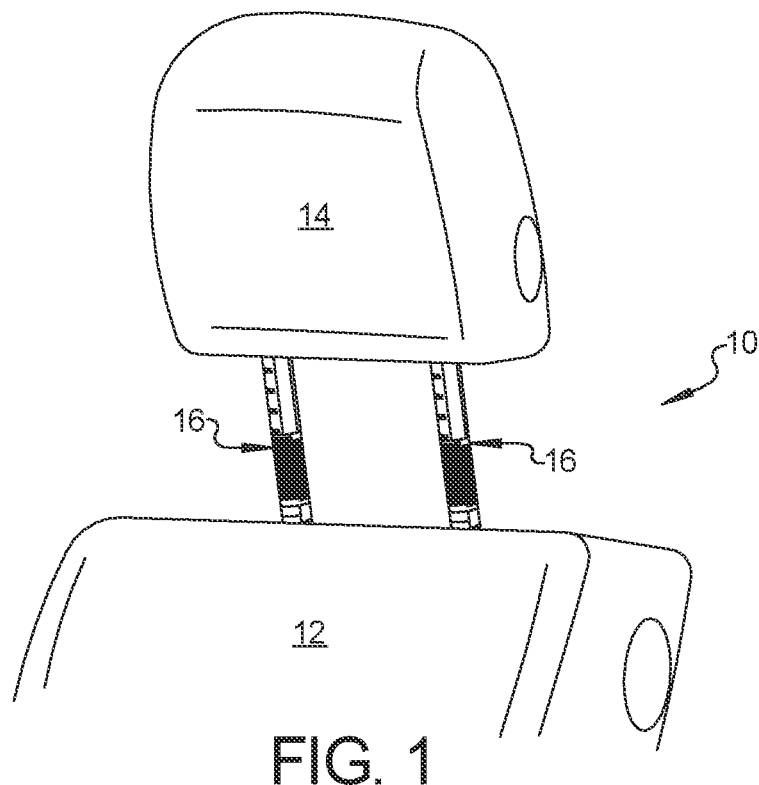
FIG. 1 is a perspective view of an automotive seat according to an exemplary embodiment, wherein a headrest is not deflected.

Referring to FIG. 1, an automotive seat 10 in accordance with the present disclosure includes a seatback 12, a headrest 14, and a pair of headrest supports 16 adapted to support the headrest 14 on the seatback 12.

Figure 2:
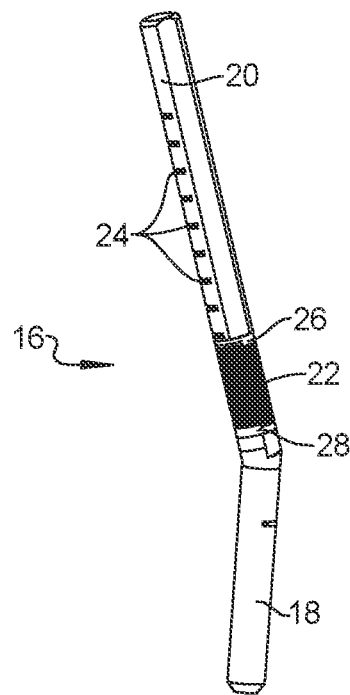
FIG. 2 is a perspective view of a headrest support according to an exemplary embodiment.

Referring to FIG. 2, each of the headrest supports 16 includes a lower rod 18, an upper rod 20, and an absorption unit 22 positioned between and interconnecting the lower rod 18 and the upper rod 20. Each upper rod 20 is adapted to be received within an opening formed in the headrest 14. In an exemplary embodiment, the upper rods 20 include detents 24 formed therein that engage compliant nodes (not pictured) within the headrest 14 to allow the vertical position of the headrest 14 to be adjusted. Each lower rod 18 is adapted to be received within the seatback 12. In an exemplary embodiment, each absorption unit 22 includes a first end 26 that is threadingly engaged with the associated upper rod 20 and a second end 28 that is threadingly engaged with the associated lower rod 18. It should be understood to those skilled in the art, that other methods of attaching the first end 26 of the absorption unit 22 to the upper rod 20 and attaching the second end 28 of the absorption unit 22 to the lower rod 18 may be incorporated without departing from the scope of the present disclosure.

Figure 3:
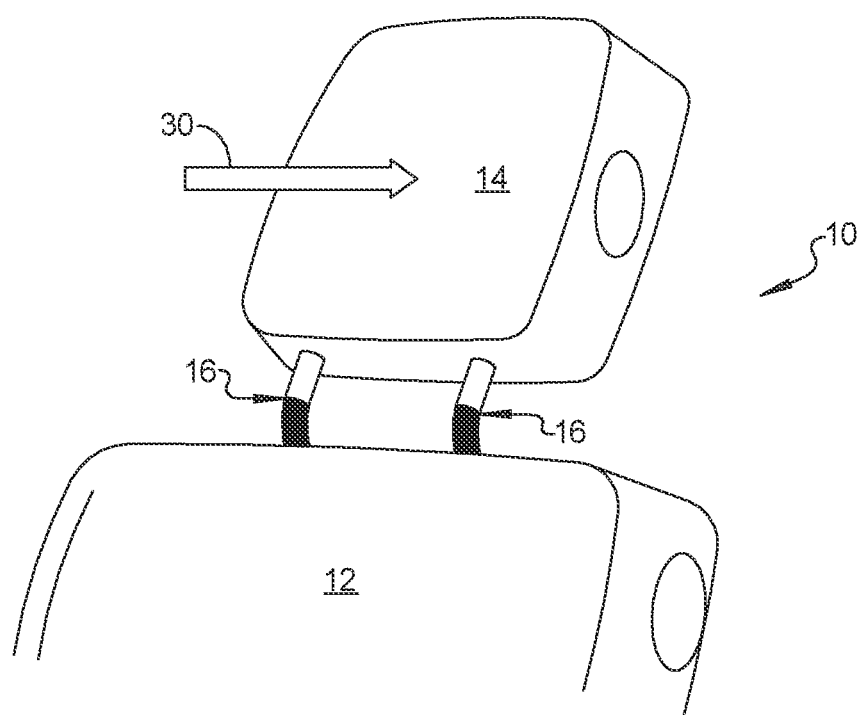
FIG. 3 is a perspective view of an automotive seat according to an exemplary embodiment, wherein the headrest is deflected.

The absorption unit 22 is adapted to allow angular deflection of the upper rod 20 relative to the lower rod 18 when a bending force is applied to the upper and lower rods 20, 18, and to hold the lower and upper rods 18, 20 in a deflected orientation when the bending force is removed from the upper and lower rods 20, 18. A normal, un-deflected position of the headrest 14 is shown in FIG. 1. Referring to FIG. 3, during a collision, the head of a passenger may be pushed backward against the headrest 14 with force, as indicated by arrow 30. If the force is sufficient, the absorption units 22 will allow the upper rods 20 to deflect relative to the lower rods 18, whereby the headrest 14 moves backward to a deflected orientation, as shown in FIG. 3.

Each absorption unit 22 includes a first component 32 and a second component 34. The first component 32 of each absorption unit 22 is adapted to absorb energy and deflect under bending forces and the second component 34 of each absorption unit 22 is adapted to lock the first components 32 in the deflected orientation once force is removed, thus keeping the headrest 14 in the deflected position, as shown in FIG. 3.

Figure 4:
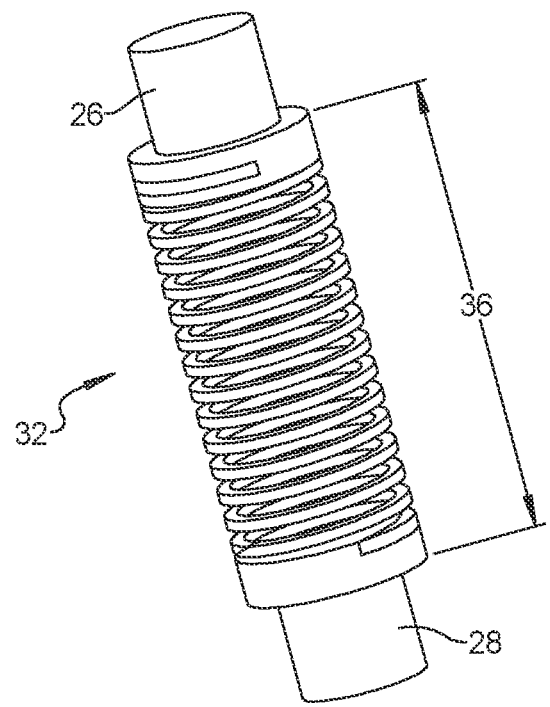
FIG. 4 is a perspective view of a first component of an absorption unit for a headrest support according to an exemplary embodiment.
Figure 5:
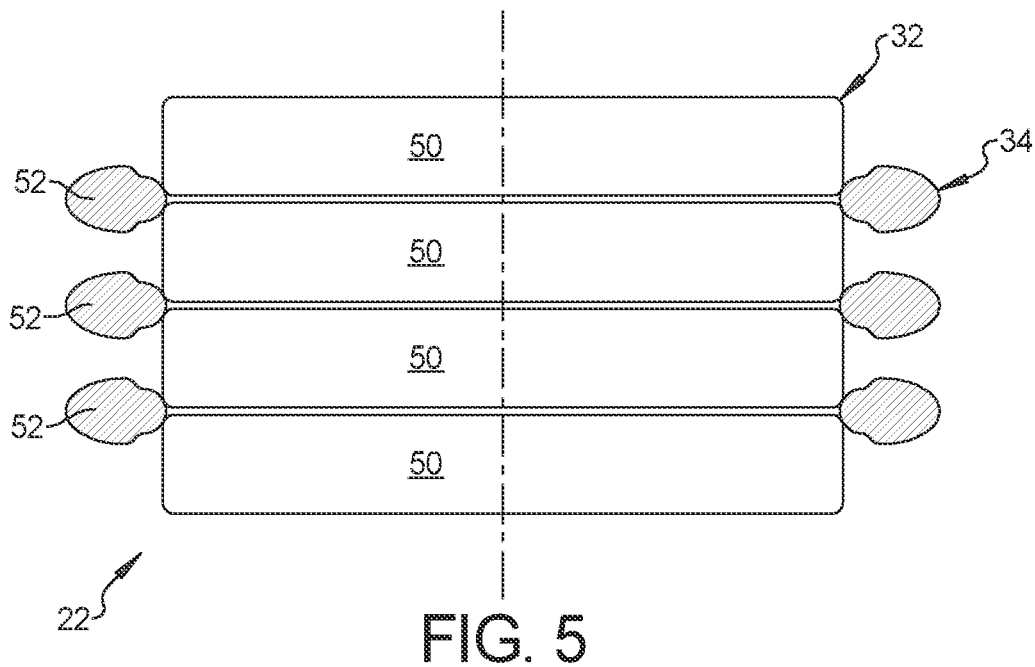
FIG. 5 is a schematic side view of a first component for an absorption unit for a headrest support with a second component for the absorption unit shown in section, wherein the absorption unit is not deflected.

Referring to FIG. 4, in an exemplary embodiment, the first component 32 of each absorption unit 22 is a helical element comprising a length of helically coiled wire. Referring to FIG. 5, the second component 34 of each absorption unit 22 is a helical element comprising a length of helically coiled wire encircling the associated first component 32 and extending longitudinally along an entire length 36 of the associated first component 32.

Figure 6:
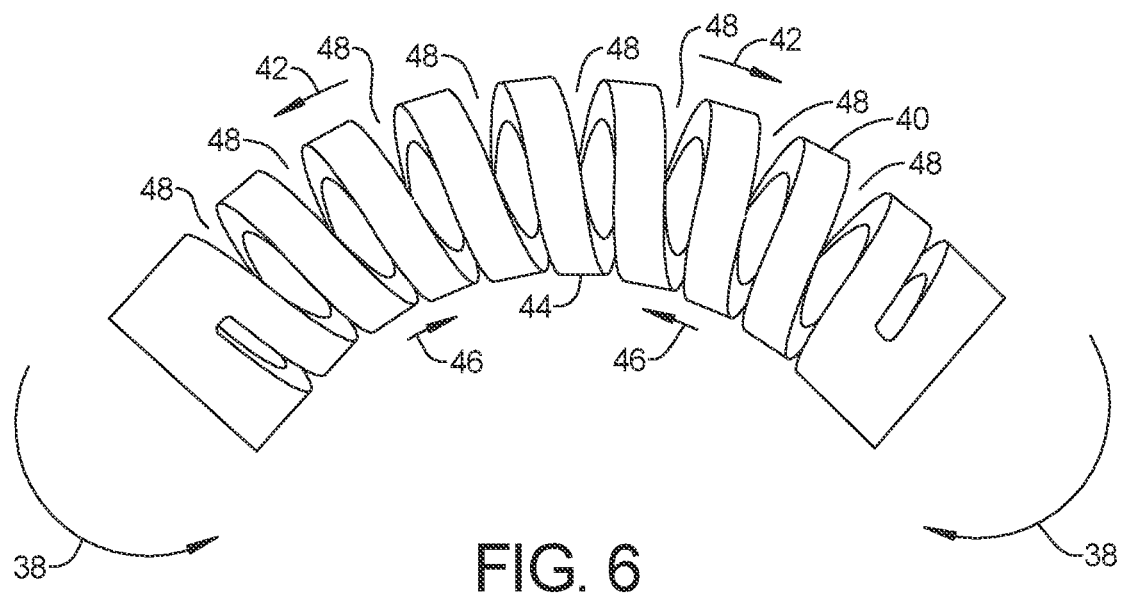
FIG. 6 is a side view of a first component that has been deflected.

When force is applied to the headrest 14, as shown by arrow 30 in FIG. 3, the first component 32 of each of the absorption units 22 deflects due to bending forces, indicated by arrows 38, in FIG. 6. Deflection of the first components 32 causes tension on an outer radius 40 of the deflected first components 32, as shown by arrows 42, and compression on an inner radius 44 of the deflected first components 32, as shown by arrows 46. Tension on the outer radius 40 of the first components 32 expands gaps 48 between adjacent coils 50 of the first components 32.

The first components 32 resists expansion along the outer radius 40 much like a tension spring. The force necessary to deflect the first component 32 increases as the first component 32 deflects. Thus, the first component 32 gradually absorbs energy slowing movement of the headrest 14 (and the head of a passenger within the automobile) backward, until backward movement of the headrest 14 stops.

Figure 7:
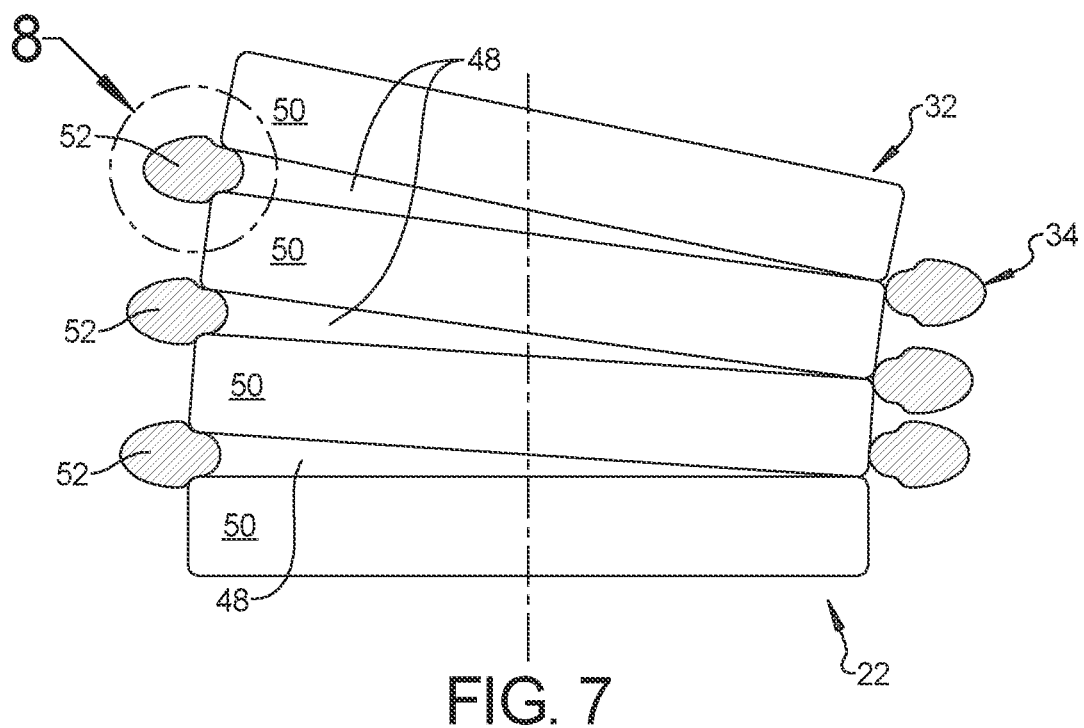
FIG. 7 is a schematic side view of a first component for an absorption unit for a headrest support with a second component for the absorption unit shown in section, wherein the absorption unit is deflected.

Referring to FIG. 7, for each absorption unit 22, upon deflection of the first component 32, coils 52 of the second component 34 slide into the gaps 48 formed between adjacent coils 50 of the first component 32 on the outside radius 40 of the deflected first component 32. With coils 52 of the second component 34 positioned between adjacent coils 50 of the first component 32, the first component 32 is prevented from returning to an undeflected orientation. Thus, the coils 52 of the second component 34 lock the first component 32 in the deflected orientation, and lock the headrest 14 in the deflected position, as shown in FIG. 3.

Figure 8:
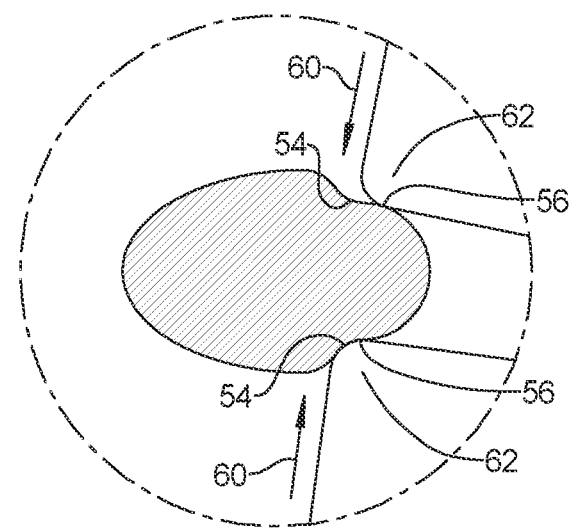
FIG. 8 is an enlarged portion of FIG. 7, as indicated by the circle labelled FIG. 8 in FIG. 7.

Referring to FIG. 8, in an exemplary embodiment, a cross sectional shape of the helically coiled wire of each of the second components 34 includes notches 54 that define axial surfaces 56 adjacent an inner diameter 58 of the second component 34. The axial surfaces 56 are adapted to engage the coils 50 of the first components 32 when the coils 52 of the second components 34 slide into the gaps 48 formed between adjacent coils 50 of the first components 32. The axial surfaces 56 provide support for the coils 50 of the first component 32, as tension within the first component 32 pulls adjacent coils 50 of the first component 32 axially toward one another, as indicated by arrows 60. The axial surfaces 56 provide more stable support and reduce the likelihood that the coils 52 of the second component 34 will slip out of the gaps 48, thus securely locking the first component 32 in the deflected orientation, and locking the headrest 14 in the deflected position, as shown in FIG. 3.

A cross sectional shape of the helically coiled wire of each of the first components 32 may be generally circular, oval, rectangular, or other suitable shape. In an exemplary embodiment, as shown in FIG. 7 and FIG. 8, the first component 32 has a generally rectangular shape which provides relatively sharp corners 62 that more effectively engage the notches 54 and axial surfaces 56 of the second component 34.

An automotive seat 10, headrest 14 and headrest support 16 of the present disclosure offers several advantages. These include the ability of the headrest 14 to flex backward while gradually absorbing energy when a backward force 30 is applied to the headrest 14, and locking the headrest 14 in a deflected position after the force 30 is removed.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A headrest support rod, comprising:
   a lower rod;
   an upper rod; and
   an absorption unit including a first component and a second component positioned between and interconnecting the lower rod and the upper rod, the first component adapted to absorb energy and deflect under bending forces to allow angular deflection of the upper rod relative to the lower rod when a bending force is applied to the upper and lower rods, and the second component adapted to lock the first component in the deflected orientation to hold the lower and upper rods in a deflected orientation when the bending force is removed from the upper and lower rods.

2. The headrest support of claim 1, wherein the first component is a helical element comprising a length of helically coiled wire, and deflection of the first component expands gaps between adjacent coils of the first component on an outside of the deflected first component.

3. The headrest support of claim 2, wherein the second component is a helical element comprising a length of helically coiled wire encircling the first component and extending longitudinally along an entire length of the first component, and upon deflection of the first component, coils of the second component slide into the gaps formed between adjacent coils of the first component on an outside of the deflected first component to lock the first component in the deflected orientation.

4. The headrest support of claim 3, wherein a cross sectional shape of the helically coiled wire of the second component includes axial surfaces adjacent an inner diameter of the second component, the axial surfaces adapted to engage the coils of the first component when the coils of the second component slide into the gaps formed between adjacent coils of the first component on the outside of the deflected first component to lock the first component in the deflected orientation.

5. The headrest support of claim 4, wherein a cross sectional shape of the helically coiled wire of the first component is one of generally circular, oval, or rectangular.

6. The headrest support of claim 5, wherein the absorption unit includes a first end that is threadingly engaged with the upper rod and a second end that is threadingly engaged with the lower rod.

7. The headrest support of claim 6, wherein the upper rod is adapted to be received within a headrest of an automobile.

8. The headrest support of claim 7, wherein the lower rod is adapted to be received within a seatback of an automobile.

9. An automotive seat with headrest assembly, comprising:
  a seatback;
  a headrest; and
  a pair of headrest supports adapted to support the headrest on the seatback, each of the headrest supports including:
    a lower rod;
    an upper rod; and
    an absorption unit including a first component and a second component positioned between and interconnecting the lower rod and the upper rod, the first component adapted to absorb energy and deflect under bending forces to allow angular deflection of the upper rod relative to the lower rod when a bending force is applied to the upper and lower rods, and the second component adapted to lock the first component in the deflected orientation to hold the lower and upper rods in a deflected orientation when the bending force is removed from the upper and lower rods.

10. The automotive seat with headrest assembly of claim 9, wherein each first component is a helical element comprising a length of helically coiled wire, and deflection of the first components expands gaps between adjacent coils of the first components on an outside of the deflected first components.

11. The automotive seat with headrest assembly of claim 10, wherein each second component is a helical element comprising a length of helically coiled wire encircling the associated first component and extending longitudinally along an entire length of the associated first component, and upon deflection of the first components, coils of the second components slide into the gaps formed between adjacent coils of the first components on the outside of the deflected first components to lock the first components in the deflected orientation.

12. The automotive seat with headrest assembly of claim 11, wherein a cross sectional shape of the helically coiled wire of each of the second components includes axial surfaces adjacent an inner diameter of the second component, the axial surfaces adapted to engage the coils of the first components when the coils of the second components slide into the gaps formed between adjacent coils of the first components on the outside of the deflected first components to lock the first components in the deflected orientation.

13. The automotive seat with headrest assembly of claim 12, wherein a cross sectional shape of the helically coiled wire of each of the first components is one of generally circular, oval, or rectangular.

14. The automotive seat with headrest assembly of claim 13, wherein each absorption unit includes a first end that is threadingly engaged with the associated upper rod and a second end that is threadingly engaged with the associated lower rod.

15. The automotive seat with headrest assembly of claim 14, wherein each upper rod is adapted to be received within the headrest.

16. The automotive seat with headrest assembly of claim 15, wherein each lower rod is adapted to be received within the seatback.

17. An automotive seat with headrest assembly, comprising:
  a seatback;
  a headrest; and
  a pair of headrest supports adapted to support the headrest on the seatback, each of the headrest supports including:
    a lower rod adapted to be received within the seatback;
    an upper rod adapted to be received within the headrest; and
    an absorption unit positioned between and interconnecting the lower rod and the upper rod and including a first helical element comprising a length of helically coiled wire and adapted to absorb energy and deflect under bending forces to allow angular deflection of the upper rod relative to the lower rod, and a second helical element comprising a length of helically coiled wire encircling and extending longitudinally along an entire length of the first component and adapted to lock the first component in a deflected orientation once the bending force is removed;
    wherein, deflection of the first component expands gaps between adjacent coils on an outside of the deflected first component and coils of the second components slide into the gaps formed between adjacent coils of the first component to lock the first component in the deflected orientation, when the bending force is removed.

18. The automotive seat with headrest assembly of claim 17, wherein a cross sectional shape of the helically coiled wire of each of the second components includes axial surfaces adjacent an inner diameter of the second component, the axial surfaces adapted to engage the coils of the first components when the coils of the second components slide into the gaps formed between adjacent coils of the first components on the outside of the deflected first components to lock the first components in the deflected orientation.

* * * * *